(12) United States Patent
Khoury

(10) Patent No.: US 7,102,106 B2
(45) Date of Patent: Sep. 5, 2006

(54) DOMESTIC APPLIANCES

(76) Inventor: Edward Joseph Khoury, 19 Scouler Way, Perth, Bateman, Western Australia 6150 (AU)

( * ) Notice: Subject to any disclaimer, the term of this patent is extended or adjusted under 35 U.S.C. 154(b) by 98 days.

(21) Appl. No.: 10/981,260

(22) Filed: Nov. 4, 2004

(65) Prior Publication Data

US 2005/0117894 A1 Jun. 2, 2005

(51) Int. Cl.
*H01R 27/00* (2006.01)
*A47J 27/21* (2006.01)
*A47J 31/54* (2006.01)

(52) U.S. Cl. ............... 219/438; 219/385; 219/386; 219/395; 219/435; 99/323.3; 99/279

(58) Field of Classification Search ............... 219/438, 219/385, 386, 395, 414, 429, 432, 433, 435; 99/279, 284, 291, 323.3
See application file for complete search history.

(56) References Cited

U.S. PATENT DOCUMENTS

| 5,160,852 A | 11/1992 | Charles et al. |
| 5,936,828 A | 8/1999 | Nolan et al. |
| 5,949,960 A | * 9/1999 | Hall .............................. 392/454 |
| 6,328,584 B1 | 12/2001 | Follett |

FOREIGN PATENT DOCUMENTS

| CA | 2289821 | 11/1999 |
| CA | 2289821 A1 * | 5/2004 |
| JP | 4046526 | 2/1992 |
| JP | 2003135274 | 5/2003 |
| WO | WO 01/47399 | 7/2001 |

* cited by examiner

*Primary Examiner*—Joseph Pelham
(74) *Attorney, Agent, or Firm*—D. Peter Hochberg; Sean Mellino; Katherine R. Vieyra

(57) ABSTRACT

A kettle is described having a pair of heating elements each connected to a cable with a plug at its end. The two plugs can be inserted into two separate sockets of a wall plug so that each heating element separately receives power from the sockets.

7 Claims, 1 Drawing Sheet

DOMESTIC APPLIANCES

BACKGROUND OF THE INVENTION

1. Field of the Invention

This invention relates to domestic appliances.

2. Description of the Prior Art

The present invention is concerned with a domestic appliance having a heating apparatus comprising a heating element, a cable having a connection apparatus such as a plug at one end whereby the cable may be connected to a source of electrical power, normally a socket, and a connector apparatus for the heating apparatus capable of being connected to the other end of the cable. Such a domestic appliance is hereinafter referred to as an "appliance of the kind set forth". The invention is particularly concerned with an appliance which is a water boiler such as a kettle or an urn.

The speed at which such an appliance or its contents can be heated is determined by the wattage of the power supply to the heating apparatus. This wattage is determined by the current capacity of the connection apparatus or the source of power, the latter of which is often controlled by a fuse or otherwise determined by the building regulations in various states. In many domestic arrangements the amperage is limited, for example, to 5 amperes. This in turn limits the power supply to the heating apparatus because the voltage of domestic power supplies is normally fixed. When the power supply voltage is low, such as 120 volts as in the United States and Canada, the power supply to the heating apparatus is relatively low, thereby causing the heating apparatus to heat slowly.

Solutions to this problem have been suggested in the patent literature. These solutions involve using an adapter which is arranged to draw power from a plurality of connection apparatuses and to increase the voltage of its output so that increased power is provided to the heating apparatus. Typical of such prior arrangements are those described in CA 2,289,821, U.S. Pat. No. 6,328,584; U.S. Pat. No. 5,160,852; and U.S. Pat. No. 5,936,828. Such solutions require the use of appliances produced for other markets which has limited the application of such arrangements.

Kettles have also been disclosed having a plurality of heater elements in WO 01/47399, JP 4046526 and JP 2003135274. In WO 01/47399 and JP 2003135274 the second heater element is provided to maintain the water temperature after it has boiled. In JP 4046526 one heater element is to be used when the power supply is low and another when the power supply is high. There is no indication that the two heater elements in any of these references are supplied with power from separate power supplies. None of these references deal with or attempt to show a solution to the problem facing the inventor as set forth above.

SUMMARY OF THE INVENTION

According to one aspect of the present invention, there is provided a domestic appliance of the kind set forth further including a second heater element, a second control means for the second heater element and a second cable connected at one end to the second control apparatus and at its other end to the second connection apparatus whereby it may be connected to another source of power.

The first and second connection apparatuses may comprise separate plugs capable of being operatively inserted into separate power sockets respectively. Alternatively the connection apparatus may comprise a splitter to which the cables are connected and from which a pair of cables extend to two separate plugs capable of being operatively inserted into separate power sockets respectively.

Each connector may be a permanent connector. Alternatively each connector may be a releasable connector. In such an arrangement each connector may comprise a plug and socket device and the two plugs of said devices may be embodied in a single moulding.

The appliance is conveniently a domestic water boiler including a water chamber and the heating elements are located within the chamber.

Embodiments of the invention will now be described by way of example with reference to the accompanying diagrammatic drawings.

DETAILED DESCRIPTION OF THE INVENTION

Figure 1:
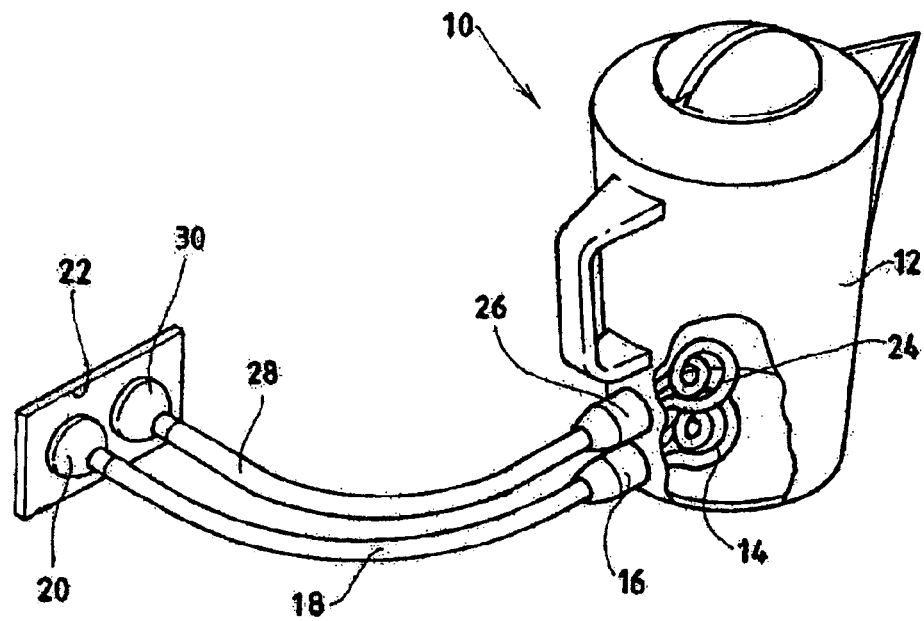
FIG. 1 is a side view of a kettle of the present invention.

Referring now to FIG. 1 there is a shown a domestic appliance of the present invention in the form of a water boiler which is a kettle 10. The kettle 10 comprises a container 12 for water to be heated therein. Within the container 12 is a first heating element 14 secured by a fixed connector 16 passing through the wall of the container 12. An electric cable 18 connects the connector 16 to a plug 20 that plugs into one socket of a multiple socket wall plug indicated at 22.

Also provided in the container 12 is a second heating element 24 conveniently placed above the first heater element 14. This second heater element 24 also has a fixed connector 26 passing through the wall of the container 12 and thence via a separate cable 28 and plug 30 to a separate socket of the wall plug 22.

Each heating element can draw power from its associated socket to or near to the maximum that it is rated to supply. As a consequence, the water in the container will be heated by two heater elements 14 and 24 and the wattage of the power supply is greater than that which could be supplied by a single socket so that the time for boiling the water will be significantly reduced or even halved.

The two elements 14 and 24 may be of the same wattage or of a different wattage, as desired.

Figure 2:
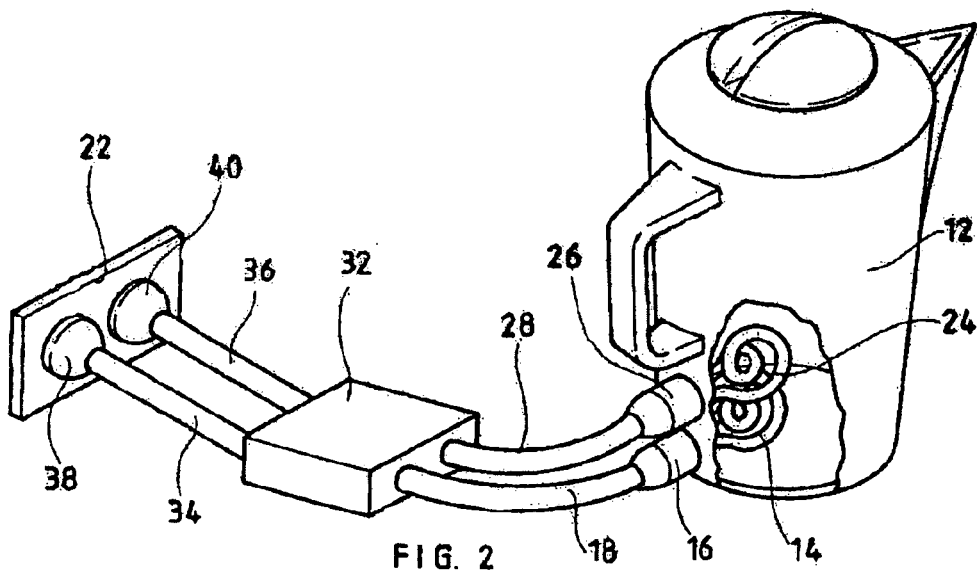
FIG. 2 is a side view of an alternative embodiment of the kettle of the present invention.

Reference is now made to FIG. 2 wherein the same reference numerals are given to the same elements. In this Figure there is shown a kettle having two heating elements 14 and 24 similar to the kettle of FIG. 1. In this arrangement however the cables 18 and 28 from the elements are connected to an intermediate adapter device 32. The adapter device 32 has two extension cables 34 and 36 each having a plug 38 and 40 at the remote end which enter into two sockets of a wall plug 22. Within the control device 32 is provided electronic means for splitting the power supply to the two heater elements so that each operates to its most effective capacity. This arrangement also decreases the time for boiling the water in the kettle.

The invention is not limited to the precise constructional details hereinbefore described and illustrated in the drawings. For example the appliance may be any other domestic appliance including heater element means. The water boiler may be an urn or the like. Instead of a permanent connection between the cable and the heating element, the connection may be a releasable connection which will permit the container to be removed from the cable for filling or other purposes. Typically the releasable connection may comprise a plug at the end of the cable and a socket device carried by the container wall. In such a case the plugs of both connectors may be incorporated in a single moulding or similar arrangement to facilitate attachment to and removal from the appropriate sockets. An On/Off switch may be provided at the connectors. Other known features of kettles can be incorporated in the embodiments of the invention as will be appreciated by those skilled in the art. In certain circumstances, the appliance may incorporate more than two heating elements each with their own attachments.

The cables in the first embodiment may be bound or otherwise connected together over part of their length between the plugs and the connectors. In the second embodiment the cables may be bound or otherwise connected together over part of their length between the plugs and the control unit on the one hand and/or between the control unit and the connectors on the other. This will provide a more compact and neater arrangement.

The invention has been described with particular emphasis on the preferred embodiments, but variations and modifications within the spirit and scope of the invention may occur to those skilled in the art to which the invention pertains.

I claim:

1. A domestic appliance having a heating apparatus comprising:
    a first heating element;
    a first cable having two ends and a first connection apparatus at one end for connecting said first cable to a source of electrical power;
    a first connector apparatus for said first heating element, said first connector apparatus able to be connected to the other end of the first cable;
    a second heating element;
    a second connector apparatus for the second heating element; and
    a second cable having two ends, said second cable connected at one end to the second connector apparatus and at the other end of said second cable to a second connection apparatus for connecting said second cable to another source of power.

2. The appliance according to claim 1, wherein the first and second connection apparatuses comprise separate plugs capable of being operatively inserted into separate power sockets.

3. The appliance according to claim 1, wherein each connector is a permanent connector.

4. The appliance according to claim 1, wherein each connector is a releasable connector.

5. The appliance according to claim 4, wherein each connector comprises a plug and socket device and wherein the two plugs of said devices are embodied in a single moulding.

6. The appliance according to claim 1, wherein the connection apparatus comprises a splitter to which the cables are connected and from which a pair of cables extend to two separate plugs capable of being operatively inserted into separate power sockets.

7. The appliance according to claim 1, wherein the appliance is a domestic water boiler including a water chamber and wherein said first and second heating elements are located within the chamber.

* * * * *